(12) United States Patent
Shachar et al.

(10) Patent No.: US 12,386,539 B2
(45) Date of Patent: Aug. 12, 2025

(54) DATA STORAGE THROUGH OFFLOADING SIGNATURE COMPUTATIONS

(71) Applicant: Dell Products L.P., Round Rock, TX (US)

(72) Inventors: Tomer Shachar, Beer-Sheva (IL); Arieh Don, Newton, MA (US); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/478,255

(22) Filed: Sep. 29, 2023

(65) Prior Publication Data
US 2025/0110654 A1    Apr. 3, 2025

(51) Int. Cl.
*G06F 3/06* (2006.01)
(52) U.S. Cl.
CPC .......... *G06F 3/0641* (2013.01); *G06F 3/0604* (2013.01); *G06F 3/067* (2013.01)
(58) Field of Classification Search
CPC ....... G06F 3/0604; G06F 3/0641; G06F 3/067
See application file for complete search history.

(56) References Cited

U.S. PATENT DOCUMENTS

| | | | |
|---|---|---|---|
| 8,214,428 B1* | 7/2012 | Christiaens | G06F 11/1464 707/633 |
| 8,930,648 B1* | 1/2015 | Storer | G06F 3/0641 711/161 |
| 9,020,900 B2* | 4/2015 | Vijayan Retnamma | G06F 3/067 707/698 |
| 2013/0097380 A1* | 4/2013 | Colgrove | G06F 3/0608 711/E12.017 |
| 2013/0290274 A1* | 10/2013 | Patil | G06F 11/1453 707/690 |
| 2019/0369896 A1* | 12/2019 | Jreij | G06F 3/061 |
| 2020/0327017 A1* | 10/2020 | Vijayan | G06F 11/1453 |
| 2023/0105771 A1* | 4/2023 | Lu | G06F 3/0608 707/692 |
| 2023/0106987 A1* | 4/2023 | Shemer | G06F 3/0671 707/692 |

* cited by examiner

*Primary Examiner* — Aracelis Ruiz
(74) *Attorney, Agent, or Firm* — WOMBLE BOND DICKINSON (US) LLP

(57) ABSTRACT

Methods and systems for offloading signature computations are disclosed. The signature computations may be offloaded from a storage array to a host. The host may use data processing units or graphical processing units to process the signature computations. In processing the signature computations by the host, the storage array may further process deduplication of the signatures, once they are received from the host. The host may require that the storage array support the distributed system and the deduplication procedure and meet a deduplication ratio specified by a criteria.

20 Claims, 7 Drawing Sheets

DATA STORAGE THROUGH OFFLOADING SIGNATURE COMPUTATIONS

FIELD

Embodiments disclosed herein relate generally to data storage. More particularly, embodiments disclosed herein relate to offloading hash signature computations from a storage array to a host.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for offloading hash signature computations in a distributed system. The distributed system may include one or more hosts and one or more storage arrays. The storage arrays may be responsible for storing data. To store data, the storage arrays may break up the data into chunks in a process called chunking. For each chunk, a hash signature may be computed using a secure hash algorithm (SHA), Each hash signature may be compared to existing hash signatures already stored on the storage arrays, a process called deduplication. If a hash signature may match an already existing hash signature in storage, then a reference counter for a hash signature is increased by one. Conversely, if a hash signature may not match an already existing hash signature, then new data may be written and the hash signature may be catalogued on the storage arrays.

In the process of writing data, described above, the hash signature generation process may be the most computationally demanding step. In being the most computationally demanding step, hash signature generation may be limited by the processing capacity of one or more storage arrays. To facilitate hash signature generation, rather than modify the processing capacity of one or more storage arrays, hash signature generation may be offloaded to one or more hosts. With offloading hash signature generation to one or more hosts, processing of hash signature generation may become reliant on a processing capacity defined by one or more data processing units or graphical processing units (DPU/GPU).

With hash signature computations offloaded, one or more hosts may communicate with one or more storage arrays to ensure (i) each storage array supports distributed deduplication, (ii) one or more hosts supports the deduplication algorithm in the storage array, and (iii) the deduplication rate sufficiently meets deduplication criteria in offloading hash computations.

Once requirements regarding deduplication have been satisfied that ensure one or more storage arrays are compatible with one or more hosts in a distributed system, hash signature computations in a data write may be offloaded to one or more hosts.

In an embodiment, a method for storing data in a distributed system is provided. The method may include (i) chunking, by a host of the distributed system, the data into chunks; (ii) obtaining, by the host, signatures for each of the chunks using a hardware offload engine of the host; (iii) providing, by the host and to a storage array of the distributed system, a first storage request comprising at least the signatures; (iv) obtaining, by the host and from the storage array, a storage response that indicates at least one of the chunks is to be provided to the storage array; and (v) providing, by the host and to the storage array, a second storage request comprising the at least one of the chunks.

The method may further include, prior to chunking the data, (i) making a first determination regarding whether the storage array supports a distributed deduplication; and (ii) in a first instance of the first determination where the storage array supports the distributed deduplication: (a) obtaining information regarding a deduplication algorithm implemented by the storage array to support the distributed deduplication; and (b) making a second determination regarding whether the hardware offload engine supports the deduplication algorithm.

The method may further include, in the first instance of the second determination where the hardware offload engine does support the deduplication algorithm, (i) making a third determination regarding whether the deduplication ratio meets a criteria; (ii) authorizing use of the distributed deduplication for the storage array, in first instance of the third determination where the deduplication ratio meets the criteria; and (iii) remediating the distributed deduplication to facilitate future authorization of the distributed deduplication for the storage array, in second instance of the third determination where the deduplication ratio does not meet the criteria.

The method may further include, in the first instance of the first determination where the storage array supports the distributed deduplication, remediating the distributed deduplication to facilitate future authorization of the distributed deduplication for the storage array, in a second instance of the second determination where the hardware offload engine does not support the deduplication algorithm.

The method may further include remediating the storage array to facilitate future authorization of the distributed deduplication for a remediated storage array, in a second instance of the first determination where the storage array does not support the distributed deduplication.

The hardware offload engine may include at least one of a data processing unit and a graphical processing unit.

The method may further include (i) comparing, by the storage array and based on the first storage request, a first set of signatures to a second set of signatures; (ii) increasing, on the storage array, an integer number value, by one, of copies of the signature on a register, in a first instance that a signature in the first set of signatures duplicates a signature in the second set of signatures; and (iii) in a second instance that a signature in the first set of signatures does not duplicate a signature in the second set of signatures, (a) appending the signature to a list of signatures in the first storage request; and (b) generating the storage response based on the list of signatures.

The first storage request may further include a header indicating an amount of the signatures, and metadata for each signature of the signatures.

The second storage request may further include a portion of the signatures that correspond to the at least one of the chunks.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Figure 1:
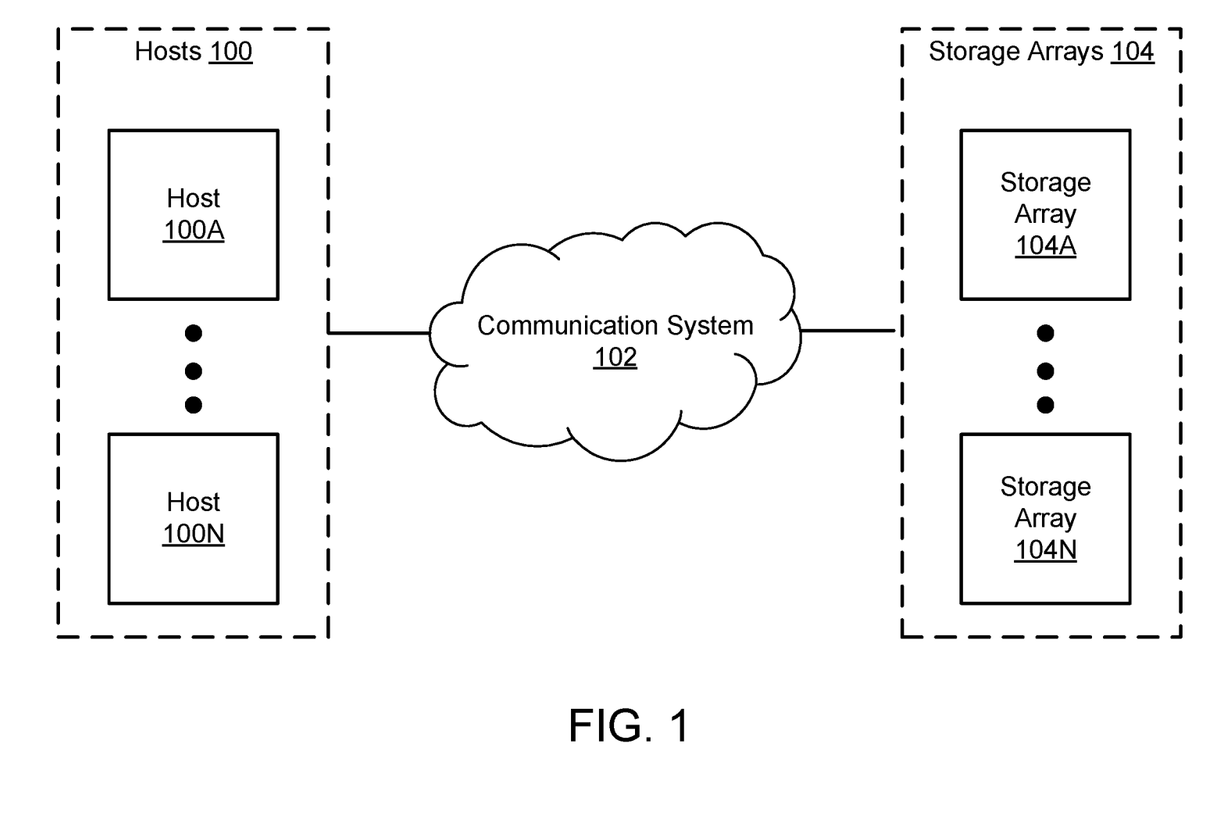
FIG. 1 shows a diagram illustrating a system in accordance with an embodiment.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system of FIG. 1 may include hosts 100 and storage arrays 104. Hosts 100 may host various applications that may provide the computer implemented services. When providing the computer implemented services, hosts 100 may obtain new data and use previously obtained data. To facilitate use of the new and previously obtained data, hosts 100 may utilize storage services provided by storage array 104.

To utilize the storage services provided by storage array 104, any of hosts 100 may send one or more commands to any of storage arrays 104. The commands may include read, write, and/or delete commands for data access purposes.

When write commands from one or more of hosts 100 are obtained, one or more of storage array 104 may be tasked with storing portions of data. To store the portions of data, storage arrays 104 may write the portions of data to persistent storage. However, storage arrays 104 may have a finite amount of persistent storage space in which data may be stored.

To enhance the amount of data that may be stored in the finite amount of persistent storage space, deduplication of the portions of data against data already stored in the persistent storage may be performed. Deduplication may be the process of eliminating redundant data from a data set (e.g., data stored in the persistent storage).

To perform deduplication, the data being written may be broken into chunks of data via chunking. To identify whether any chunk is duplicate of chunks in a dataset, a hash signature for each chunk may be computed using a secure hash algorithm (SHA). Each hash signature may be compared to hash signatures of chunks of a data set to identify whether the chunk is duplicative of a chunk in the dataset. If the hash signature for a chunk matches one of the existing hash signatures of any chunk of the dataset, then the chunk may be treated as being redundant (e.g., duplicative). Rather than storing the chunk, a reference count for the matched hash signature and corresponding chunk may be incremented. Otherwise, the chunk may be stored as part of the dataset and the hash signature of the chunk may be added to a catalogue of hash signatures of chunks of the dataset so that future instances of the chunk included in write commands may be deduplicated.

However, the computation resources required for computing hash signatures for chunks may become considerable. Consequently, deduplication may place a significant computational load on storage arrays 104.

If the computational load exceeds the resources available to storage arrays 104, the process of storing data may begin to impact hosts 100. For example, if hosts 100 are unable to store and access data due to limits imposed on them by storage arrays 104 (e.g., storage arrays 104 being overwhelmed with ready/write/delete commands), then the rate at which hosts 100 may be able to provide computer implemented services may be reduced. For example, the computer implemented services may be storage access limited. Accordingly, even if hosts 100 have ample processing and memory resources, the rate at which the computer implemented services are provided may be limited by storage arrays 104.

In general, embodiments disclosed here relate to systems and methods for offloading workloads for generation of hash signatures for deduplication (and/or other) purposes. To offload the workloads for generation of hash signatures, a distributed deduplication framework may be utilized. The distributed deduplication may shift responsibility for generation of hash signatures from the storage arrays to hosts. Thus, the hash signature generation workloads may be offloaded from storage arrays 104 to one or more hosts (e.g., 100).

To offload the hash signature generation workloads from the storage arrays, a host may include with a data processing unit, a graphics processing unit, and/or another special purpose hardware device. The special purpose hardware device may include special purpose hardware and/or configurable hardware for generation of hash signatures.

To store data in a storage array, a host may attempt to identify whether the storage array supports the distributed framework. To do so, the host may send a message to the storage array. The message may query the storage array to see if the storage array supports offloading of hash signatures generation workloads. If the storage array does not support offloading hash signatures generation workloads, then the storage array may be remediated to support offloading computations of hash signatures and/or non-distributed deduplication frameworks may be used.

However, if the storage array supports offloading of hash signature generation workloads, then the host may continue the process of determining whether the storage arrays supports the distributed deduplication framework by sending a second message to the storage array. The second message may query if the storage array supports the deduplication algorithm supported by the host as part of the distributed deduplication framework. If the storage array does not support the deduplication algorithm, then the storage array may be remediated to support the deduplication algorithm and/or non-distributed deduplication frameworks may be used. Otherwise, if the storage array does support the deduplication algorithm, then the host may attempt to ascertain whether use of the distributed deduplication framework is likely to provide a desirable computational benefit.

To ascertain whether use of the distributed deduplication framework is likely to provide a desirable computational benefit, the host may cooperate with a storage array to compute a deduplication ratio and/or other metrics which may indicate the extent of any computational benefit provided by the distributed deduplication framework. The deduplication ratio may be used to assess the benefit for offloading of hash signature generation workloads. The deduplication ratio may be computed by sending sample data (representative of data that will likely be stored in the storage array in the future) to the storage array for deduplication (e.g., using non-distributed deduplication). The deduplication ratio may be the number of chunks of the sampled data that were duplicate of existing chunks (e.g., as identified by deduplication) divided by the total number of chunks derived from the sample data. If the deduplication ratio is deemed acceptable by a criteria (e.g., a threshold), then offloading of hash signatures workloads may be authorized for the host because doing so will likely yield a computational benefit (e.g., the exceeds the overhead introduced by the distributed deduplication framework). Otherwise, if the deduplication ratio is deemed to be unacceptable by the criteria, then various actions may be performed to attempt to improve the ratio and/or deduplication may not be used by the host and storage array.

With authorization given for offloading of hash signatures generation workloads, data to be stored in a storage array may be chunked by a host. For each chunk, a hash signature may be computed. The chunking/hashing may be offloaded to DPU/GPU/other special purpose hardware of the host.

Once obtained, the hash signatures may be sent to the storage array. The storage array may compare the hash signatures to other signatures for chunks that are present in the storage array. The storage array may respond to the host with a list of hash signatures corresponding to chunks that are not present in storage array.

The host may receive the list of hash signatures not referenced in the storage array. Using the list of hash signatures, the host may send data chunks, corresponding to the list of hash signatures, to the storage array. The storage array may write the data chunks to storage, update reference counters for chunks that were found to be duplicative, and/or may perform other actions to facilitate recovery of data stored in the storage array (e.g., generating recipes or other representations of chunks for each portion of data such that the chunks may be retrieved from persistent storage and used to regenerate the stored portion of the data to facilitate future access to the stored portion of the data).

While described with respect to only sending signatures initially, it will be appreciated that the signatures and chunks may be sent at the same time to the storage array for processing (e.g., identifying whether any chunks are duplicative). Thus, when the storage array receives the signatures and the chunks, the storage array may perform deduplication for the signatures and the chunks. In this manner, fewer commands may be sent between the host and the storage array (e.g., the storage array may not need to identify and request copies of chunks that are not duplicative).

If the signatures and chunks are sent to the storage array for deduplication, metadata may be added that identifies the number of signatures and/or chunks. For example, the metadata may be included in a header and may specify that the signatures are included in a particular block, with the data being in other blocks. The metadata may allow the storage array to efficiently process the signatures and chunks. To implement this approach, a communication protocol that includes special purpose commands for receiving both chunks and signatures may be used (e.g., may include metadata descriptions of the chunks/signatures) and/or general purpose write commands may be used to facilitate distribution of chunks and signatures to storage arrays.

To provide the above noted functionality, the system may include hosts 100, storage arrays 104, and communication system 102. Each of these components is discussed below.

Hosts 100 may include any number of host 100A-100N. Host 100A-100N may provide computer implemented services. As part of the computer implemented services, hosts may store data in storage arrays 104 in accordance with the distributed deduplication framework, discussed above. Hosts 100 may participate in the distributed deduplication framework at least in part by (i) generating commands (read/write/delete), (ii) performing chunking of data, (iii) transferring chunks of data, and (iv) computing hash signatures. Computations of hash signatures may be facilitated with one or more DPU/GPU/other special purpose hardware of host 100A-100N. Host 100A-100N may also communicate with any of storage array 104 to ensure support of offloading computations of hash signatures and implementation of deduplication algorithms.

Figure 2A:
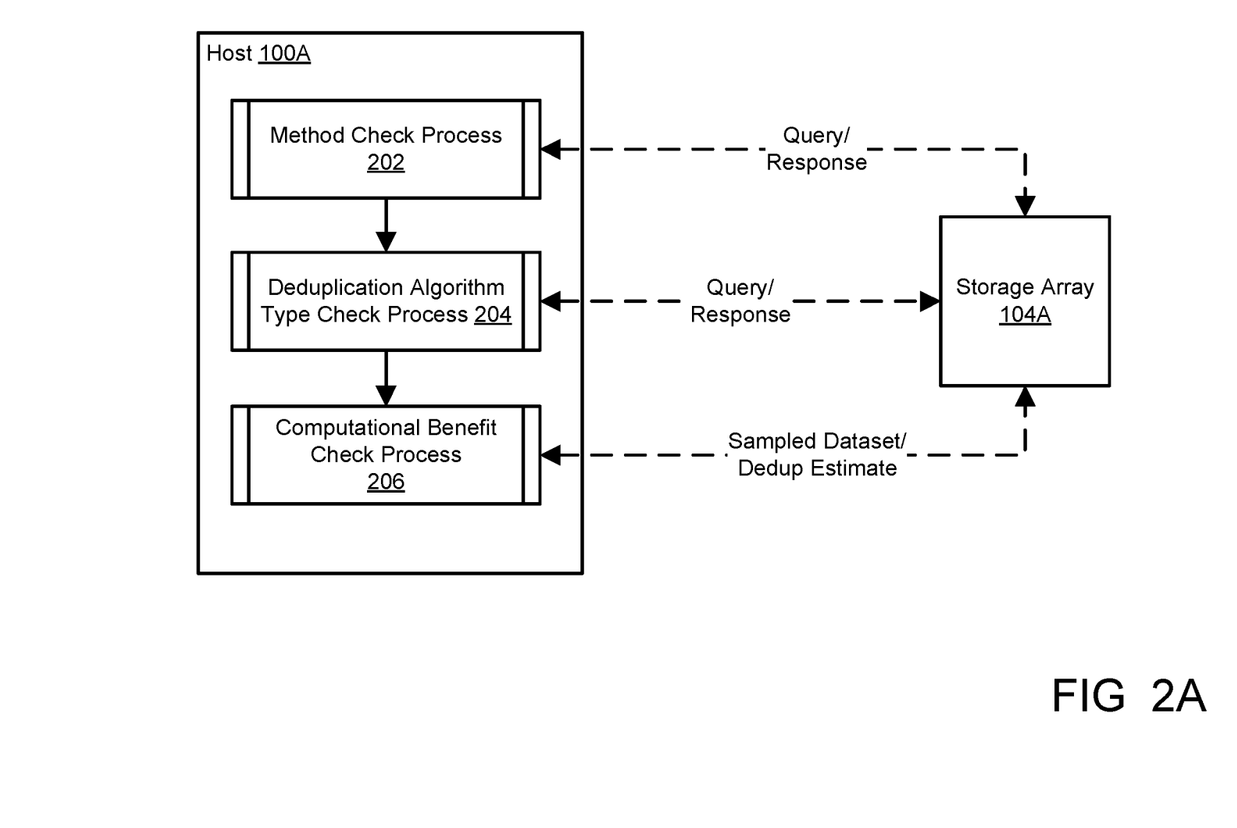
FIGS. 2A-2C show data flow diagrams in accordance with an embodiment.
Figure 2B:
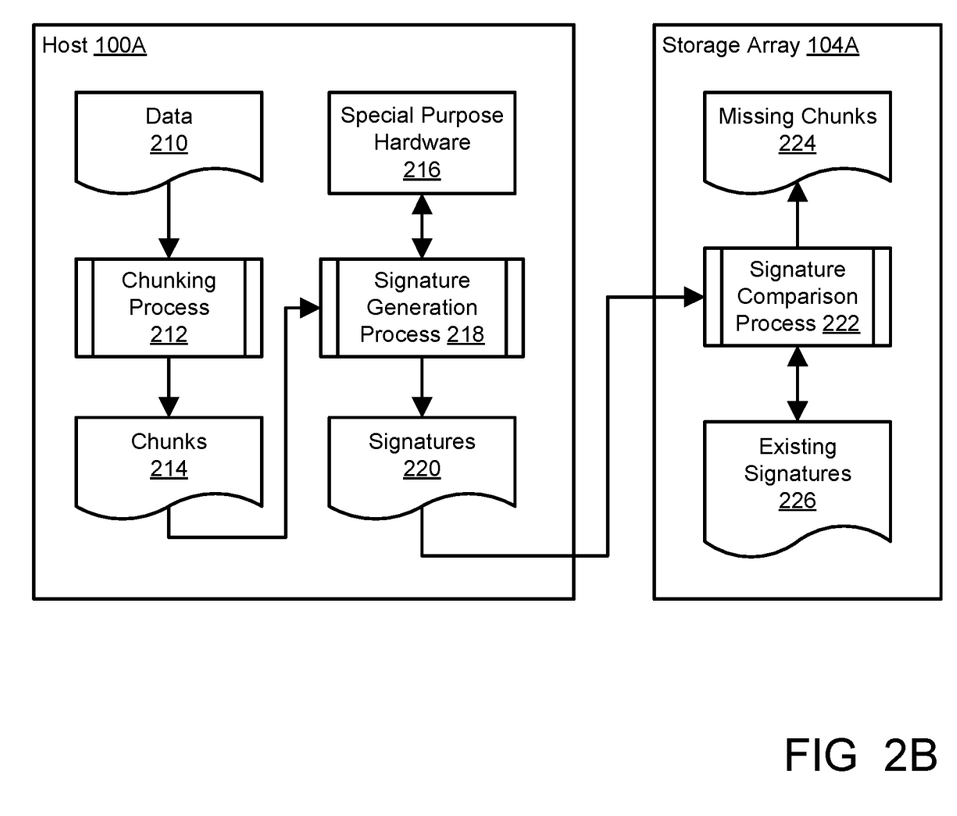
Figure 2C:
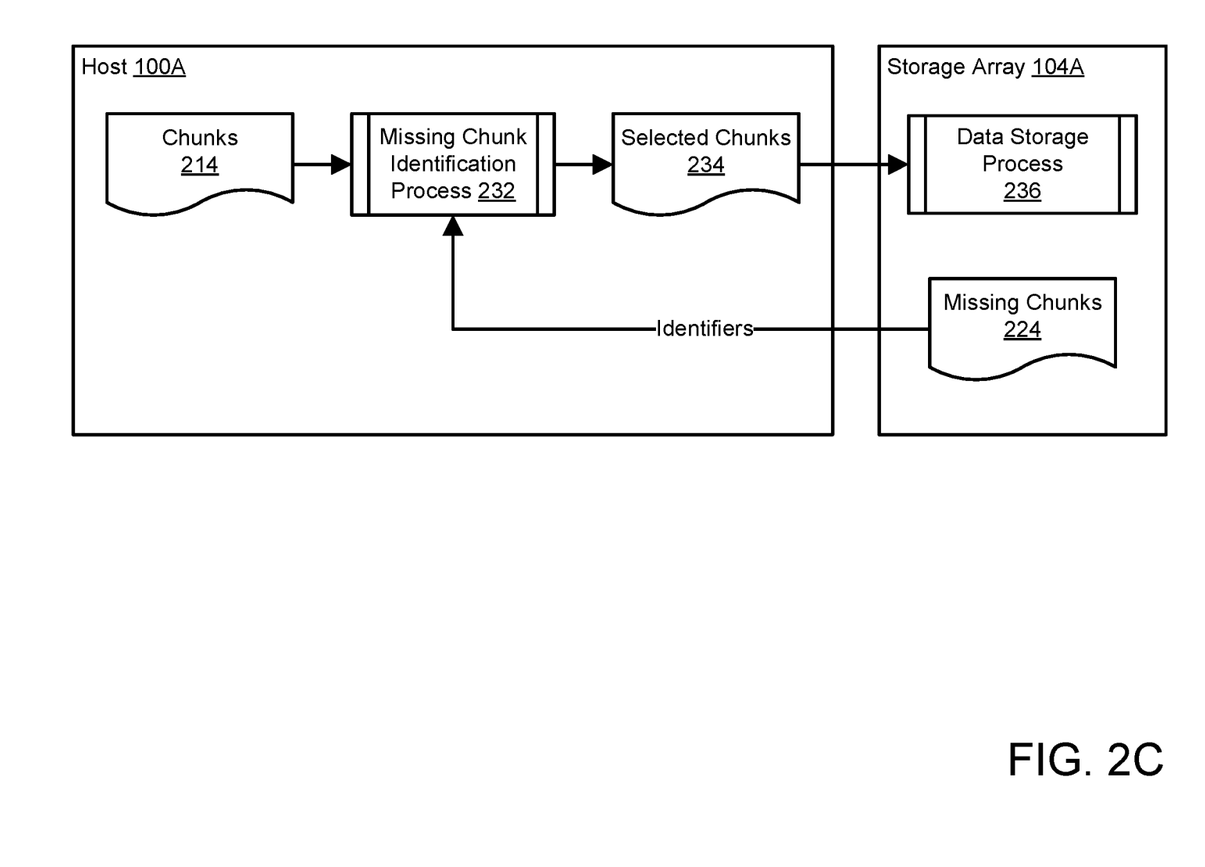

Storage arrays 104 may include any number of storage array 104A-104N. Storage array 104A-104N may facilitate storage and access to data from hosts 100. To do so, storage arrays 104 may participate in the distributed deduplication framework, discussed above. Refer to FIG. 2A for additional details regarding selective use of distributed deduplication frameworks based on expected computational benefits. Refer to FIG. 2B-2C for additional details regarding operation of distributed deduplication frameworks.

When providing their functionality, any of (and/or components thereof) hosts 100 and storage arrays 104 may perform all, or a portion, of the actions and methods illustrated in FIGS. 2A-3B.

Any of (and/or components thereof) hosts 100 and storage arrays 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

Thus, as shown in FIG. 1, a system in accordance with an embodiment may offload computations of hash algorithms by hosts 100 for the write of data chunks in storage array 104.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 210, 214, etc.) is used to represent data structures, a second set of shapes (e.g., 202, 204, etc.) is used to represent processes performed using and/or that generate data, and a third set of shapes (e.g., 208, etc.) is used to represent large scale data structures such as databases.

Turning to FIG. 2A, a first data flow diagram in accordance with an embodiment is shown. The first data flow diagram may illustrate data used in and data processing performed in selecting whether to use a distributed deduplication framework for data storage purposes.

To select whether to use the distributed deduplication framework, host 100A may send a series of messages to storage array 104A. Storage array 104A may respond to the messages. The responses may be used to determine whether to use the distributed deduplication framework.

If the responses to the queries confirm that the storage array support distributed deduplication frameworks, supports deduplication algorithms supported by host 100A, and that use of the distributed deduplication framework is computationally advantageous, then the distributed deduplication framework may be used by storage array 104A and host 100A. Otherwise, various remediations may be attempted and/or a non-distributed deduplication framework may be used by host 100A and storage array 104A. While described with respect to host 100A and storage array 104A, it will be appreciated that any of the components of FIG. 1 may perform similar processes.

To determine whether to use the distributed deduplication framework, method check process support 202 may be performed. During method check process 202, a message to query for support of a distributed deduplication framework by storage array 104A may be sent to storage array 104A. The message may inquire whether storage array 104A supported distributed deduplication. Storage array 104A may send a response confirming whether storage array 104A supports distributed deduplication. If the response indicates that distributed deduplication is not supported, various actions may be performed (e.g., attempting to modify operation of storage array 104A) to attempt to enable storage array 104A to support distributed deduplication.

If storage array 104A is able to support distributed deduplication, then deduplication algorithm type check process 204 may be performed. During deduplication algorithm type check process 204, a message to query storage array 104 for support of a deduplication algorithm supported by host 100A may be sent. The message may inquire regarding storage array 104 supports the deduplication algorithm, which may relate to the type of hash signatures that will be generated by host 100A. Storage array 104A may send a response which confirms whether storage array 104A supports the deduplication algorithm. If the response indicates that the deduplication is not supported, various actions may be performed (e.g., attempting to modify operation of storage array 104A) to attempt to enable storage array 104A to support the deduplication algorithm.

If storage array 104A is able to support the deduplication algorithm, computational benefit check process 206 may be performed. During computational benefit check process 206, a sampled dataset may be provided to storage array 104A. Storage array 104A may compute a deduplication rate using the sampled dataset. Storage array 104A may send the deduplication ratio back to host 100A. Computational benefit check process 206 may compare the deduplication ratio to a criteria. If the deduplication ratio is deemed acceptable by the criteria, then use of the distributed deduplication framework may be authorized for host 100A. Otherwise, if the deduplication ratio is deemed unacceptable by the criteria, then a remediation may be performed with respect to host 100A to yield a deduplication ratio if possible. Otherwise, use of the distributed deduplication framework may not be authorized, and a non-distributed deduplication framework may be used.

Thus, using the data flow shown in FIG. 2A, embodiments disclosed herein may confirm support of the deduplication methodology by the storage array.

Turning to FIG. 2B, a second data flow diagram in accordance with an embodiment is shown. The second data flow diagram may illustrate data used in and data processing performed in use of a distributed framework in storing data.

While providing computer implemented services, host 200 may generate data 210. Future use of data 210 may be expected. To enable future use of data 210, data 210 may be identified for storage in storage array 104.

To store data 210, data 210 may be present on host 100A that may need to be written to storage array 104A. However, some data of data 210 may already exist in storage array 104A. To find which portions of data 210 that is not duplicative of data stored in storage array 104A, data 210 may be broken into chunks, hash signatures for the chunks may be obtained, and the obtained hash signature may be compared to hash signatures of chunks stored in storage array 104A.

To obtain the chunks for data 208, chunking process 212 may be performed. During chunking process 212, data 208 may be broken into one or more of chunks 214.

Once chunks 214 are obtained, signature generation process 218 may be performed. During signature generation process 218, hash signatures for chunks 214 may be generated. Any of chunks 214 may be processed by special purpose hardware 216. Special purposes 216 may include data processing units, graphical processing units, and/or other types of hardware that may provide computational resources for generating signatures 220 for chunks 214. By using special purpose hardware 216, the computational burden may be offloaded from processors or other hardware of host 100A tasked with providing computer implemented services. Signature generation process 218 may produce signatures 220, including the set of hash signatures for chunks 214.

Signatures 220 may be provided to storage array 104A by host 100A. When signatures 220 are obtained by storage array 104A, signatures 220 may be ingested by signature comparison process 222. During signature comparison process 222, each signature of signatures 220 may be compared to each signature of existing signatures 226. Existing signatures 226 may be hash signatures for chunks already present in storage array 104A. Signatures comparison process 222 may yield non-matching hash signatures between signatures 220 and existing signatures 226. The non-matching hash signatures (e.g., missing chunks 224) may be hash signatures for chunks of chunks 214 that are not duplicative of chunks stored in storage array 104.

Thus, using the data flow shown in FIG. 2B, embodiments disclosed herein may facilitate workload shifting for identification of chunks that are duplicative from storage array 104A to host 100A.

Turning to FIG. 2C, a third data flow diagram in accordance with an embodiment is shown. The third data flow diagram may illustrate data used in and data processing performed in storage of non-duplicative chunks of data.

To store non-duplicative chunks, identifiers of missing chunks 224 may be provided to host 100A. When the identifiers are obtained by host 100A, missing chunk identification process 232 may be performed.

During missing chunk identification process 232, the identifiers may be used to identify a portion of chunks 214 corresponding to the identifiers. The identified chunks may be added to selected chunks 234.

Selected chunks 234 may be provided to storage array 208. Once selected chunks 234 are obtained by storage array 208, data storage process 236 may be performed. During data storage process 236, selected chunks 234 may be stored in persistent storage of storage array 104A, corresponding hash signatures may be catalogued in storage array 104A, counters corresponding to duplicative chunks may be incremented (e.g., to indicate that additional copies of the chunk are stored in storage array 208), and/or other actions may be performed to facilitate access to data 210 in the future.

Thus, using the data flow shown in FIG. 2C, embodiments disclosed herein may facilitate deduplicated storage of data in storage array 104.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
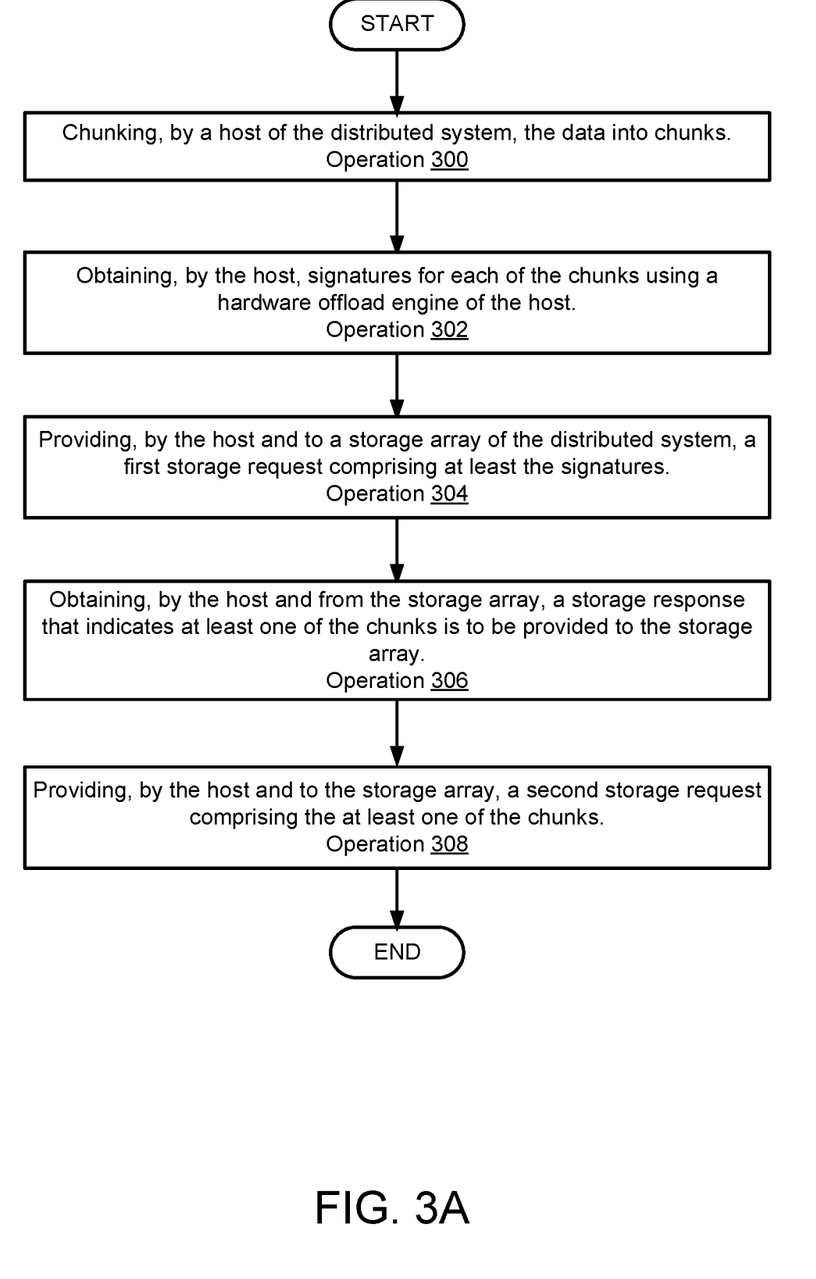
FIGS. 3A-3B show flow diagrams illustrating methods in accordance with an embodiment.
Figure 3B:
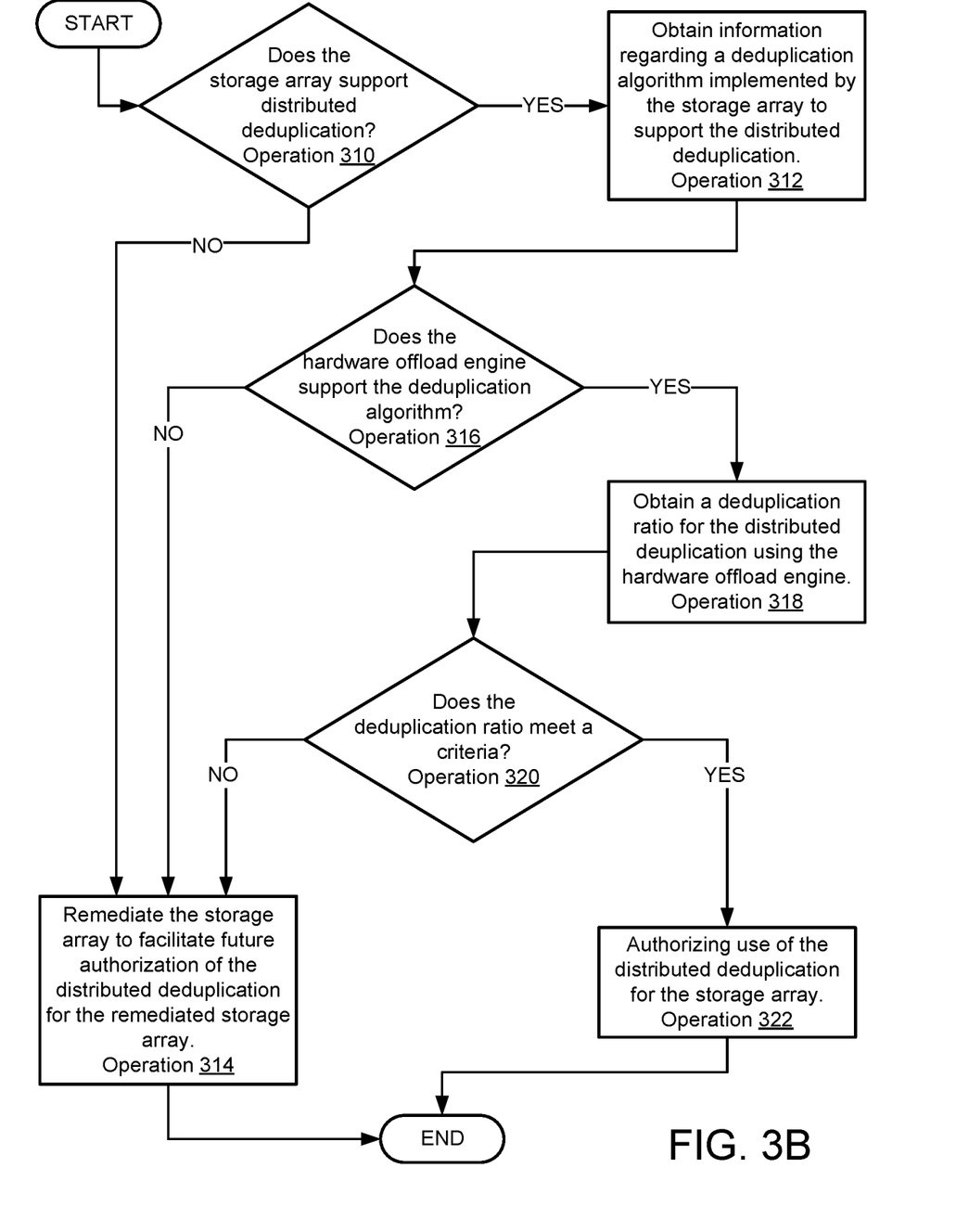

As discussed above, the components of FIG. 1 may perform various methods to store data in distributed systems using a distributed deduplication framework. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of storing data in a distributed system in accordance with an embodiment is shown. The method may be performed, for example, by any of the components of the system of FIG. 1, and/or other components not shown therein.

Prior to operation 300, data may be obtained. Future use of the data may be expected.

At operation 300, the data may be chunked, by the host of the distributed system, into chunks. The data may be chunked by splitting the data into smaller pieces of data. The data may be chunked using an algorithm that results in consistent chunks being generated so that similar data may be similarly chunked each time data (and somewhat changed data) is chunked.

At operation 302, signatures for each of the chunks may be obtained by using a hardware offload engine of the host. The signatures for each of the chunks may be obtained by computing hash signatures of the chunks with a SHA, or other type of hashing algorithm.

At operation 304, a first storage request may be provided, by the host and to a storage array of the distributed system, comprising at least the signatures. The first storage request may be provided by sending at least the signatures from the host to the storage array.

At operation 306, a storage response may be obtained, by the host and from the storage array, that indicates at least one of the chunks is to be provided to the storage array. The storage response may be obtained by comparing, by the storage array and based on the first storage request, the signatures to signatures of chunks stored in the storage array. The signatures may be compared to the signatures of the chunks in the storage array by attempting to match each of the signatures to each signature of the signatures of the chunks in the storage array.

In an instance of the matching where the signature of the signature matches a signature of the signatures of the chunks in the storage array, the chunk corresponding to the signature may be deemed duplicative of a chunk stored in the storage array and a counter associated with the stored chunk and reflecting an integer number of times that duplicative chunks have been identified may be incremented (e.g., to indicate an additional duplicative chunk is now stored).

In an instance that the matching where the signature does not match signatures of any of the stored chunks, then the signature may be appended to a list of signatures of chunks that are not duplicative of chunks stored in the storage array. A storage response may be generated based on the list of signatures. The signature may be appended by attaching the signature to the list of signatures for chunks that are not duplicate. The storage response may be generated by organizing the list of signatures for chunks that are not duplicated.

At operation 308, a second storage request may be provided, by the host and to the storage array, comprising the at least one of the chunks. The second storage request may be provided by reading the list of signatures from the storage response, identifying the chunks corresponding to the read signatures, and adding the identified chunks to the second storage request. When received by the storage array, the chunks in the second storage request may be stored for future use The method may end following operation 308.

As discussed with respect to FIG. 3A, a distributed system may be implemented to store data in a storage array from a host. As discussed with respect to FIG. 2A, prior to use of a distributed deduplication framework and to decide whether to use the distributed deduplication framework, the storage array may need to be queried by the host to understand if the storage array (i) supports the distributed system, (ii) supports the deduplication algorithm, and (iii) meets a deduplication ratio with the data that may be passed from the host to the storage array to conclude that implementation of a distributed deduplication framework is computationally advantageous.

Turning to FIG. 3B, a second flow diagram illustrating a method of selecting whether to use a distributed deduplication framework in accordance with an embodiment is shown. The method may be performed, for example, by any of the components of the system of FIG. 1, and/or other components not shown therein.

At operation 310, a determination may be made regarding whether the storage array may support distributed deduplication. The determination may be made by querying, by the host, if distributed deduplication may be implemented in the storage array.

If the storage array supports distributed deduplication, then the method may proceed to operation 312. Otherwise, if the storage array does not support distributed deduplication, then then the method may proceed to operation 314.

At operation 312, information may be obtained regarding a deduplication algorithm implemented by the storage array to support the distributed distribution. The information may be obtained by requesting, by the host, information about the deduplication algorithm implemented in the storage array.

At operation 316, a determination may be made regarding whether the hardware offload engine supports the deduplication algorithm. The determination can be made by querying, by the host, the deduplication algorithm in the storage array and ensuring that the hardware offload engine can read signatures from the deduplication algorithm in the storage array.

If the hardware offload engine supports the deduplication algorithm, then the method may proceed to operation 318. Otherwise, if the hardware offload engine does not support the deduplication algorithm, then the method may proceed to operation 314.

At operation 318, a deduplication ratio may be obtained for the distributed deduplication using the hardware offload engine. A deduplication ratio may be obtained by dividing the deduplication rate for a sampled dataset computed from the hardware offload engine by the deduplication rate for a sample dataset computed by the storage array.

At operation 320, a determination may be made regarding whether the deduplication ratio meets a criteria. The determination can be made by comparing the deduplication ratio to the criteria to understand if the deduplication ratio meets the criteria.

If the deduplication ratio meets the criteria, then the method may proceed to operation 322. If the deduplication ratio does not meet a criteria, then the method may proceed to operation 314.

At operation 322, use of the distributed deduplication may be authorized for the storage array. Use may be authorized by establishing, by the host, that (i) the storage array supports distributed deduplication, (ii) the hardware offload engine supports the deduplication algorithm in the storage array, and (iii) the deduplication ratio, computed from the hardware offload engine, meets the criteria.

At operation 314, the storage array may be remediated to facilitate future authorization of the distributed deduplication for the remediated storage array. The storage array may be remediated by implementing modifications to the storage array so that all of the following are established by the storage array: (i) the storage array supports distributed deduplication, (ii) the hardware offload engine supports the deduplication algorithm in the storage array, and (iii) the deduplication ratio, computed from the hardware offload engine, meets the criteria.

The method may end following operation 314 or operation 322.

Figure 4:
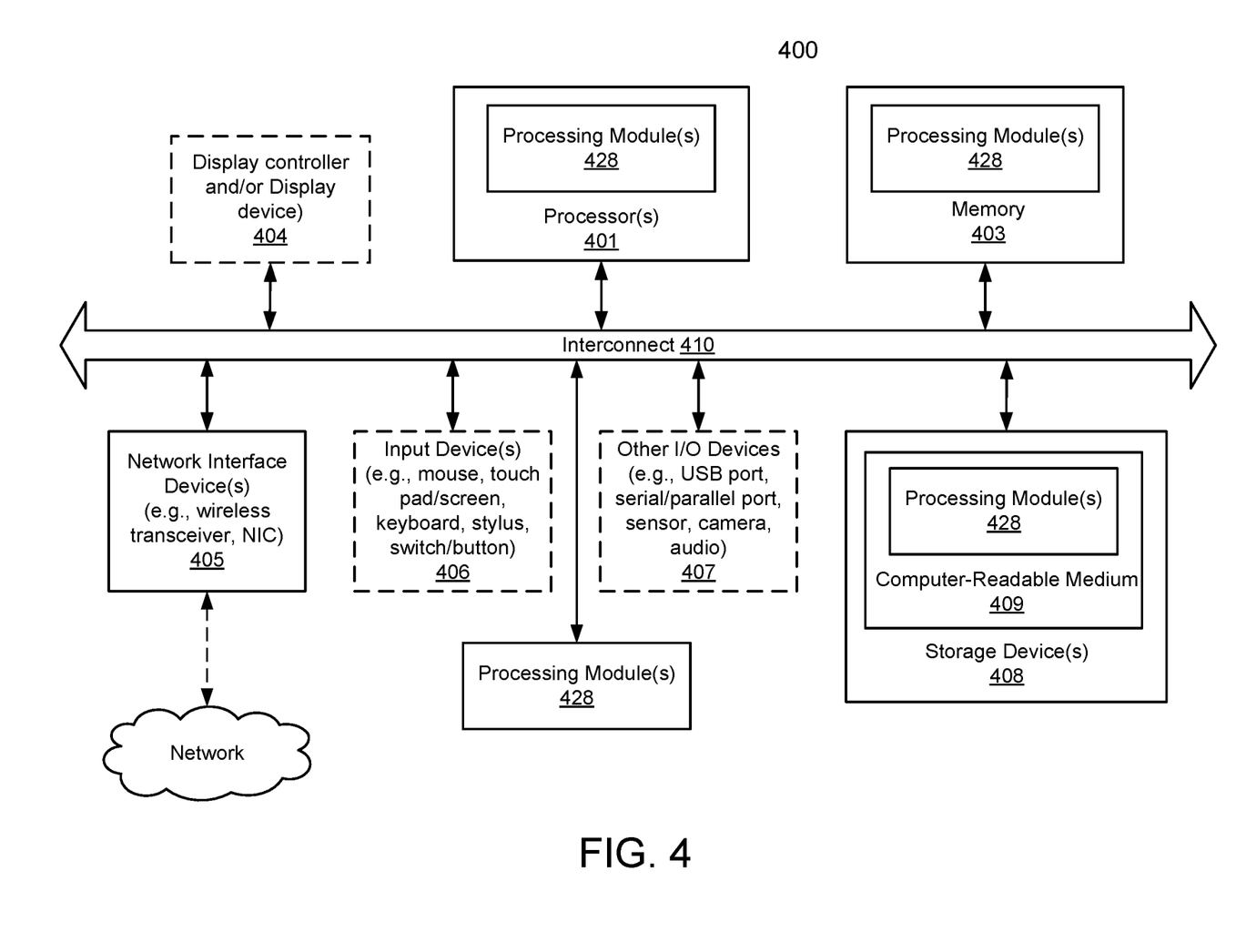
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for storing data in a distributed system, the method comprising:
   chunking, by a host of the distributed system, the data into chunks, wherein prior to the chunking, the method further comprises, by the host:
      making a first determination that a hardware offload engine of the host supports a deduplication algorithm supported by a storage array of the distributed system;
      obtaining, in response to the first determination and by the data processing system using the hardware offload engine, a deduplication ratio for a distributed deduplication associated with the deduplication algorithm supported by the storage array
      making a second determination regarding whether the deduplication ratio meets a criteria; and
      in a first instance of the second determination where the deduplication ratio meets the criteria: authorizing use of the distributed deduplication for the storage array;
   obtaining, by the host, signatures for each of the chunks using the hardware offload engine; and
   providing, by the host and to the storage array, a first storage request comprising at least the signatures to facilitate deduplicated storage of the data into the storage array by the storage array using the signatures.

2. The method of claim 1, further comprising:
   prior to the first determination, by the host
      making a third determination that the storage array supports the distributed deduplication
      in response to the third determination, obtaining information regarding the deduplication algorithm implemented by the storage array to support the distributed deduplication.

3. The method of claim 1, wherein the hardware offload engine comprises at least one of a data processing unit and a graphical processing unit.

4. The method of claim 1, further comprising:
   obtaining, by the host and from the storage array, a storage response that indicates at least one of the chunks is to be provided to the storage array;
   providing, by the host and to the storage array, a second storage request comprising the at least one of the chunks;
   comparing, by the storage array and based on the first storage request, a first set of signatures to a second set of signatures;
   in a first instance that a signature in the first set of signatures duplicates a signature in the second set of signatures:
      increasing, on the storage array, an integer number value, by one, of copies of the signature on a register; and
   in a second instance that a signature in the first set of signatures does not duplicate a signature in the second set of signatures:
      appending the signature to a list of signatures in the first storage request; and
      generating the storage response based on the list of signatures.

5. The method of claim 4, wherein the second storage request further comprises a portion of the signatures that correspond to the at least one of the chunks.

6. The method of claim 1, wherein the first storage request further comprises a header indicating an amount of the signatures, and metadata for each signature of the signatures.

7. The method of claim 1, further comprising:
in a second instance of the second determination where the deduplication ratio does not meet the criteria:
remediating the distributed deduplication to facilitate future authorization of the distributed deduplication for the storage array.

8. The method of claim 1, further comprising:
obtaining, by the host and from the storage array, a storage response that indicates at least one of the chunks is to be provided to the storage array; and
providing, by the host and to the storage array, a second storage request comprising the at least one of the chunks to store the at least one of the chunks into the storage array.

9. The method of claim 8, wherein the at least one of the chunks is determined by the storage array, using the signatures in the first storage request, as a portion of the data that has not yet been stored in the storage array.

10. A non-transitory machine-readable medium having instructions stored therein, which when executed by a processor, cause the processor to perform operations for storing data in a distributed system, the operations comprising:
chunking, by a host of the distributed system, the data into chunks, wherein prior to the chunking, the operations further comprise, by the host:
making a first determination that a hardware offload engine of the host supports a deduplication algorithm supported by the storage array;
obtaining, in response to the first determination and by the host using the hardware offload engine, a deduplication ratio for a distributed deduplication associated with the deduplication algorithm supported by the storage array;
making a second determination regarding whether the deduplication ratio meets a criteria; and
in a first instance of the second determination where the deduplication ratio meets the criteria: authorizing use of the distributed deduplication for the storage array;
obtaining, by the host, signatures for each of the chunks using the hardware offload engine;
providing, by the host and to a storage array of the distributed system, a first storage request comprising at least the signatures to facilitate deduplicated storage of the data into the storage array by the storage array using the signatures.

11. The non-transitory machine-readable medium of claim 10, wherein the operations further comprise:
prior to the first determination, by the host
making a third determination that the storage array supports the distributed deduplication
in response to the third determination, obtaining information regarding the deduplication algorithm implemented by the storage array to support the distributed deduplication.

12. The non-transitory machine-readable medium of claim 10, wherein the operations further comprise:
in a second instance of the second determination where the deduplication ratio does not meet the criteria:
remediating the distributed deduplication to facilitate future authorization of the distributed deduplication for the storage array.

13. The non-transitory machine-readable medium of claim 10, wherein the operations further comprise:
obtaining, by the host and from the storage array, a storage response that indicates at least one of the chunks is to be provided to the storage array; and
providing, by the host and to the storage array, a second storage request comprising the at least one of the chunks to store the at least one of the chunks into the storage array.

14. The non-transitory machine-readable medium of claim 13, wherein the at least one of the chunks is determined by the storage array, using the signatures in the first storage request, as a portion of the data that has not yet been stored in the storage array.

15. The non-transitory machine-readable medium of claim 10, wherein the hardware offload engine comprises at least one of a data processing unit and a graphical processing unit.

16. A data processing system, comprising:
a processor; and
a memory coupled to the processor to store instructions, which when executed by the processor, cause the processor to perform operations for storing data in a distributed system, the data processing system being configured as a hot of the distributed
obtaining, in response to the first determination and by the data processing system using the hardware offload engine, a deduplication ratio for a distributed deduplication associated with the deduplication algorithm supported by the storage array to the chunking, the operations further comprise:
making a first determination that a hardware offload engine of the host supports a deduplication algorithm supported by the storage array;
obtaining, in response to the first determination, a deduplication ratio for the distributed deduplication using the hardware offload engine;
making a second determination regarding whether the deduplication ratio meets a criteria; and
in a first instance of the second determination where the deduplication ratio meets the criteria: authorizing use of the distributed deduplication for the storage array;
obtaining signatures for each of the chunks using the hardware offload engine;
providing, to a storage array of the distributed system, a first storage request comprising at least the signatures to facilitate deduplicated storage of the data into the storage array by the storage array using the signatures.

17. The data processing system of claim 16, wherein the operations further comprise:
prior to the first determination, by the host
making a third determination that the storage array supports the distributed deduplication
in response to the third determination, obtaining information regarding the deduplication algorithm implemented by the storage array to support the distributed deduplication.

18. The data processing system of claim 16, wherein the operations further comprise:
in a second instance of the second determination where the deduplication ratio does not meet the criteria:
remediating the distributed deduplication to facilitate future authorization of the distributed deduplication for the storage array.

19. The data processing system of claim 16, wherein the operations further comprise:
obtaining, by the host and from the storage array, a storage response that indicates at least one of the chunks is to be provided to the storage array; and providing, by the host and to the storage array, a second storage request comprising the at least one of the chunks to store the at least one of the chunks into the storage array.

20. The data processing system of claim 19, wherein the at least one of the chunks is determined by the storage array, using the signatures in the first storage request, as a portion of the data that has not yet been stored in the storage array.

* * * * *

UNITED STATES PATENT AND TRADEMARK OFFICE
CERTIFICATE OF CORRECTION

PATENT NO. : 12,386,539 B2  
APPLICATION NO. : 18/478255  
DATED : August 12, 2025  
INVENTOR(S) : Tomer Shachar et al.

Page 1 of 1

It is certified that error appears in the above-identified patent and that said Letters Patent is hereby corrected as shown below:

In the Claims

Claim 16, Column 18, Line 21, after the word "distributed", the text "system and the operations comprising: chunking the data into chunks, wherein prior to the chunking, the operations further comprise:" should be added;

Claim 16, Column 18, Lines 22-27, the entire text should be removed;

Claim 16, Column 18, Line 31, after the words "the first determination", the text "and by the data processing system using the hardware offload engine" should be added;

Claim 16, Column 18, Line 32-33, the words "for the distributed deduplication" should instead read -- for a distributed deduplication --; and Claim 16, Column 18, Line 33, the text "using the hardware offload engine" should instead read -- associated with the deduplication algorithm supported by the storage array --.

Signed and Sealed this  
Eleventh Day of November, 2025

John A. Squires  
*Director of the United States Patent and Trademark Office*